US00RE43546E

(19) United States
(12) Reissued Patent
Chikaishi

(10) Patent Number: US RE43,546 E
(45) Date of Reissued Patent: Jul. 24, 2012

(54) DIGITAL BROADCASTING RECEIVING APPARATUS

(75) Inventor: Kouichi Chikaishi, Kobe (JP)

(73) Assignee: Fujitsu Ten Limited, Kobe-shi (JP)

(21) Appl. No.: 12/216,805

(22) Filed: Jul. 10, 2008

Related U.S. Patent Documents

Reissue of:
(64) Patent No.: 7,079,863
Issued: Jul. 18, 2006
Appl. No.: 10/246,726
Filed: Sep. 19, 2002

(30) Foreign Application Priority Data

Jul. 25, 2000 (JP) ..... 2001-224542

(51) Int. Cl.
*H04B 1/38* (2006.01)

(52) U.S. Cl. ... 455/557; 455/3.04; 455/41.3; 455/552.1; 455/556.1; 455/569.2

(58) Field of Classification Search ..... 455/3.01, 455/3.02, 3.04, 41.2, 41.3, 66.1, 74, 88, 306, 455/550.1, 551, 552.1, 556.1, 556.2, 566, 455/557, 569.1, 569.2
See application file for complete search history.

(56) References Cited

U.S. PATENT DOCUMENTS

| | | | | |
|---|---|---|---|---|
| 5,712,899 | A | 1/1998 | Pace, II | |
| 5,819,160 | A | 10/1998 | Foladare et al. | |
| 6,125,326 | A * | 9/2000 | Ohmura et al. | 701/213 |
| 6,658,231 | B2 | 12/2003 | Nakatsuyama | |
| 6,681,176 | B2 | 1/2004 | Funk et al. | |
| 6,941,220 | B2 * | 9/2005 | Le et al. | 701/208 |
| 2001/0049268 | A1 | 12/2001 | Kobayashi | |
| 2002/0025777 | A1 | 2/2002 | Kawamata et al. | |
| 2002/0070881 | A1 | 6/2002 | Marcarelli et al. | |
| 2002/0072390 | A1 | 6/2002 | Uchiyama | |
| 2003/0054758 | A1 | 3/2003 | Kawamata et al. | |
| 2003/0069686 | A1 * | 4/2003 | Watanabe et al. | 701/200 |
| 2003/0125076 | A1 | 7/2003 | Seppala et al. | |
| 2003/0232593 | A1 | 12/2003 | Wahlroos et al. | |

FOREIGN PATENT DOCUMENTS

| | | |
|---|---|---|
| JP | A 7-15360 | 1/1995 |
| JP | A-07-15360 | 1/1995 |
| JP | A-11-317711 | 11/1999 |
| JP | A 2000-502795 | 3/2000 |
| JP | A-2000-311029 | 11/2000 |
| JP | A-2001-141471 | 5/2001 |
| JP | A-2001-239895 | 9/2001 |
| JP | A-2003-037514 | 2/2003 |

* cited by examiner

*Primary Examiner* — Nhan Le
(74) *Attorney, Agent, or Firm* — Oliff & Berridge, PLC

(57) ABSTRACT

A digital broadcasting receiving apparatus has a fixed unit and a portable unit removably attached to the fixed unit. The fixed unit includes a tuner portion, a first memory, an audio decoder portion, an audio amplification/control portion and a first radio IF. The tuner portion receives digital broadcasting including encoded information. The first memory stores information included in the digital broadcasting. The audio decoder portion decodes audio information included in the digital broadcasting. The audio amplification/control portion outputs the audio information to a speaker. The first radio IF transmits information to the portable unit. The portable unit has a second radio IF, a second memory, a second CPU and a display/operation portion. The second radio IF receives information from the fixed unit. The second memory stores information. The second CPU decodes information. The display/operation portion displays the decoded information.

1 Claim, 1 Drawing Sheet

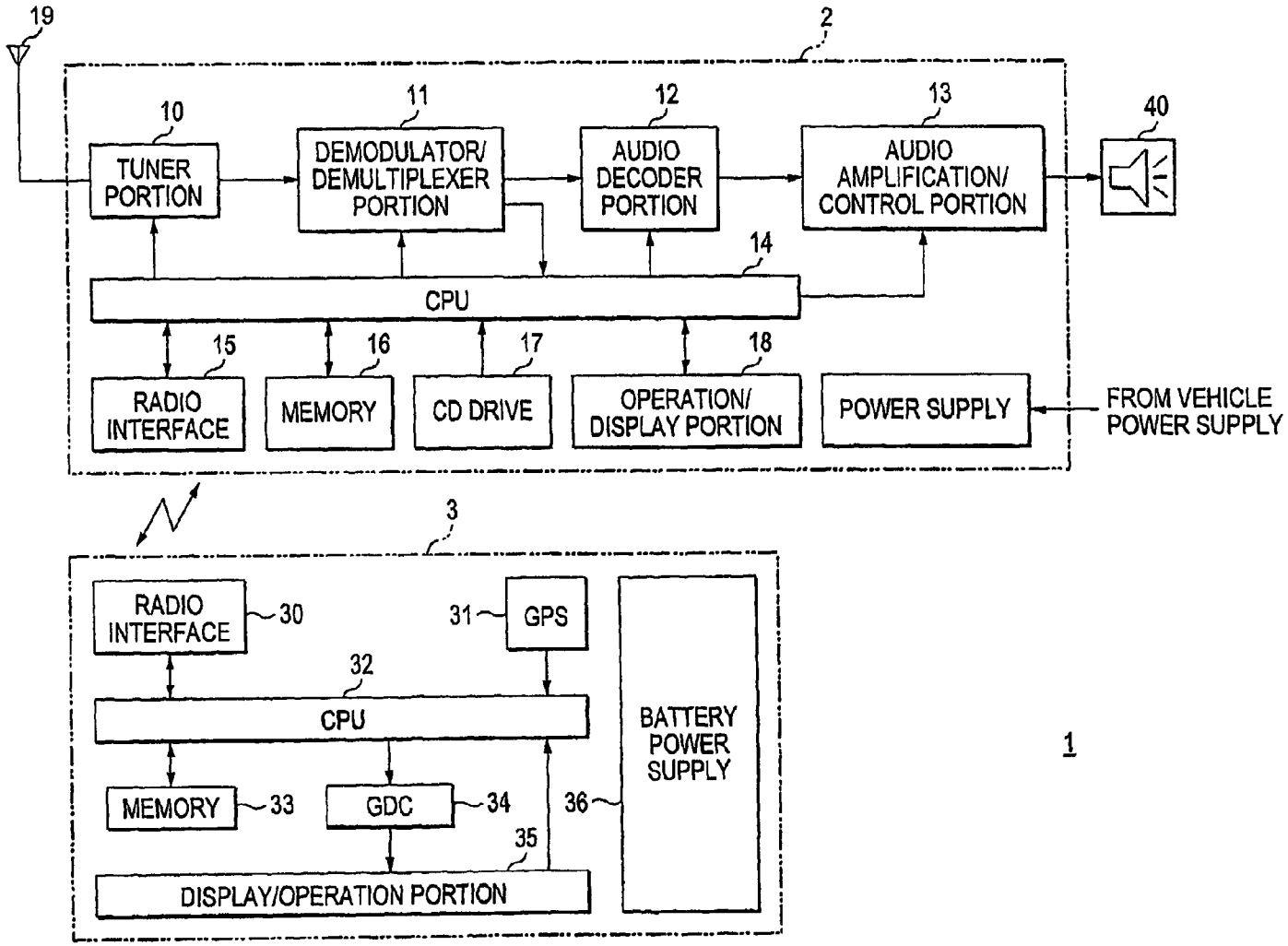
1
2
3
10
TUNER PORTION
11
DEMODULATOR/ DEMULTIPLEXER PORTION
12
AUDIO DECODER PORTION
13
AUDIO AMPLIFICATION/ CONTROL PORTION
14
CPU
15
RADIO INTERFACE
16
MEMORY
17
CD DRIVE
18
OPERATION/ DISPLAY PORTION
POWER SUPPLY
FROM VEHICLE POWER SUPPLY
19
40
30
RADIO INTERFACE
31
GPS
32
CPU
33
MEMORY
34
GDC
35
DISPLAY/OPERATION PORTION
36
BATTERY POWER SUPPLY

DIGITAL BROADCASTING RECEIVING APPARATUS

Matter enclosed in heavy brackets [ ] appears in the original patent but forms no part of this reissue specification; matter printed in italics indicates the additions made by reissue.

The present disclosure relates to the subject matter contained in Japanese Patent Application No. 2001-224542 filed on Jul. 25, 2001, which is incorporated herein by reference in its entirety.

BACKGROUND OF THE INVENTION

1. Field of the Invention

The present invention relates to a digital broadcasting receiving apparatus mounted on a movable body such as a car.

2. Description of the Related Art

Terrestrial digital audio broadcasting can transmit diversified multimedia information using character data and graphics data together with high-quality audio information differently from conventional analog broadcasting transmitting only audio information. Test broadcasts of such terrestrial digital audio broadcasting are scheduled in the Metropolis of Tokyo and the Osaka Prefecture in Japan in the first half of 2003.

As such a technique for broadcasting multimedia information, JP-A-11-317711 discloses a multimedia data broadcast program creating method for drawing a broadcast program for multimedia data to be broadcast on a broadcast channel. According to this multimedia data broadcast program creating method, a database including multimedia objects such as graphic and document files is constructed. Each of the multimedia objects is added with a descriptive text to be used for retrieving the multimedia object from the database. Next, a list of multimedia objects chosen in the database and a broadcast program following each of the multimedia objects and including transmission criteria such as transmission date and hour are extracted from the database. The transmission criteria on which possibility of transmission of the broadcast program is judged include the date and hour set in advance and an event depending on the broadcast program. Each multimedia object is broadcast according to such criteria.

In addition, JP-W-2000-502795 discloses multimedia information equipment for automatically broadcasting a multimedia animation in accordance with the geographic location of a vehicle and the date and hour. This information equipment is constituted by a fixed information station installed in a travel agency and an in-vehicle information station mounted on a vehicle. Each of the two stations has a floppy disk drive for storing information in a floppy disk and reading the stored information therefrom, or a transmission apparatus with a radio transmitter-receiver for transmitting and receiving travel parameters. Further, the in-vehicle information station has a broadcasting travel parameter stock apparatus for storing multimedia animations including information such as itineraries, and a position measuring apparatus having a global positioning system called GPS. The in-vehicle information station broadcasts a multimedia animation recorded in the stock apparatus in accordance with the travel parameters including the location of the vehicle and the date and hour and stored in a floppy disk or transmitted from the fixed information station, and the geographic data of the current location of the vehicle from the position measuring apparatus.

Terrestrial digital broadcast can be received not only by receivers fixed indoors but also by receivers mounted on moving bodies such as cars. Accordingly, a receiver which can watch and listen to a part of information at any desired place is demanded.

JP-A-7-15360 discloses electronic equipment with a built-in radio and an antitheft device, which can listen to radio broadcast by its operating unit itself. The electronic equipment has an operating unit removably attached to a body fixedly mounted on a car. This operating unit has a tuner for receiving radio waves from an antenna, a PLL built-in microcomputer for making control to tune in on a desired station from the received radio waves of the tuner, and a battery for supplying power to the tuner and the microcomputer when the operating unit is removed from the body. When the operating unit is removed from the body, an audio signal included in a radio wave received by the tuner is fed to headphones connected to the operating unit through an amplifier provided in the operating unit. Thus, the operating unit can be used as a headphone radio.

An in-vehicle digital broadcasting receiving apparatus mounted on a car is fixed to the interior of the car so that multimedia information such as character data included in digital broadcasting cannot be browsed outside the car. On the other hand, when the in-vehicle digital broadcasting receiving apparatus itself is designed to be removably mounted on a car, the apparatus itself is too large to be carried easily.

SUMMARY OF THE INVENTION

It is an object of the invention to provide a digital broadcasting receiving apparatus in which a unit for displaying multimedia information included in digital broadcasting can be made easy to carry. Thus, while the digital broadcasting receiving apparatus is mounted on a movable body such as a car, the unit can display the multimedia information not only inside the car but also outside the car. Accordingly, the multimedia information can be used effectively while the digital broadcasting receiving apparatus is good in operationality.

According to a first aspect of the invention, there is provided a digital broadcasting receiving apparatus including a fixed unit and a portable unit removably attached to the fixed unit. The fixed unit has a receiving unit for receiving digital broadcasting including a plurality of kinds of encoded information, a first decoding unit for decoding a specific kind of information included in the received digital broadcasting, a first storage unit for storing the remaining kinds of information included in the received digital broadcasting, a first output unit for outputting the information decoded by the first decoding unit, and a first communication unit for transmitting the remaining kinds of information included in the received digital broadcasting to the portable unit. The portable unit has a second communication unit for receiving the information transmitted from the first communication unit, a second storage unit for storing the information transmitted from the first communication unit, a second decoding unit for decoding the information transmitted from the first communication unit, and a second output unit for outputting the information decoded by the second decoding unit.

According to the invention, digital broadcasting is received by the receiving unit of the fixed unit. Information included in the digital broadcasting is stored in the first storage unit. A specific kind of information included in the digital broadcasting is decoded by the first decoding unit, and the decoded information is outputted by the first output unit. On the other hand, the remaining kinds of information included in the digital broadcasting are transmitted, by the first communication unit, to the portable unit removably attached to the fixed unit. The information transmitted from the fixed unit is received by the second communication unit of the portable unit, stored in the second storage unit, and decoded by the second decoding unit. The decoded information is outputted by the second output unit.

In such a manner, the portable unit can receive the remaining kinds of information from the fixed unit and output and store the received information regardless of the attachment/detachment state of the portable unit to/from the fixed unit. In the state in which such a portable unit is attached to the fixed unit, the digital broadcasting receiving apparatus can store and output all the information included in the received digital broadcasting.

Of the information included in the received digital broadcasting, a specific kind of information is decoded and outputted in the fixed unit, while the remaining kinds of information are decoded and outputted in the portable unit. Accordingly, processing required for decoding and outputting information in each of the fixed unit and the portable unit is reduced in comparison with the case where all the information included in the received digital broadcasting is decoded and outputted in either the fixed unit or the portable unit. Thus, decoding and outputting can be performed rapidly while the operationality is improved.

In addition, according to a second aspect of the invention the portable unit further includes a battery power supply for supplying power to the portable unit.

According to a third aspect of the invention, the digital broadcasting is broadcast encoded information by program unit on each of a plurality of channels. The digital broadcasting has service information including a channel, airtime and program contents of each program to be broadcast. The portable unit further includes an input unit operated by an operator. The second output unit has a display function.

The first storage unit stores the received service information and program reservation unit. The first communication unit transmits the service information to the portable unit. The second communication unit receives the service information from the first communication unit and transmits the program reservation information to the first communication unit. The second storage unit stores the received service information and the program reservation information. The second output unit displays the service information. The portable unit creates the program reservation information including channels and airtimes based on an input from the input unit and the service information.

According to the invention, the service information included in the digital broadcasting is stored in the first storage unit of the fixed unit, and also transmitted to the portable unit. The transmitted service information is received by the portable unit, stored in the second storage unit and also displayed by the display function of the second output unit. In the portable unit, program reservation information including channels and airtimes is created based on the input from the input unit and the service information. The program reservation information is stored in the second storage unit and transmitted to the fixed unit by the second communication unit. Thus, the program reservation information is also stored in the first storage unit of the fixed unit.

In such a manner, regardless of the attachment/detachment state of the portable unit to/from the fixed unit, an operator can make reservations of desired programs easily by inputting channels and airtimes of the desired programs from the input unit while browsing the service information displayed on the second output unit. In addition, the fixed unit can receive the programs desired by the operator on the basis of the program reservation information.

In addition, since the program reservation information is stored in the second storage unit of the portable unit, the operator can browse the program reservation information regardless of the attachment/detachment state of the portable unit to/from the fixed unit. Further, the program reservation information is stored in the respective storage units of the fixed unit and the portable unit. Accordingly, if the program reservation information stored in the first storage unit of the fixed unit were deleted for some reason, the fixed unit could receive the programs desired by the operator on the basis of the program reservation information stored in the second storage unit of the portable unit. On the contrary, if the program reservation information stored in the second storage unit of the portable unit were deleted for some reason, the portable unit could make the second output unit display the program reservation information stored in the first storage unit of the fixed unit.

In addition, according to a fourth aspect of the invention, the digital broadcasting includes traffic information showing conditions of traffic routes. The fixed unit further includes a recording medium reading unit for reading information recorded on a recording medium demountably mounted in the fixed unit. The first communication unit transmits the traffic information and map information read from the recording medium by the recording medium reading unit. The portable unit further includes a position calculating unit for receiving position reference information from position information satellites and calculating position information regarding a current position of the portable unit based on the position reference information, an input unit operated by an operator, and a navigation unit for executing a route finding function to find a route from a starting point to a destination inputted from the inputting unit based on the map information, the traffic information, the starting point and the destination. The second output unit displays map, the current position, and the found route based on the map information, the position information, and the finding result. The second communication unit receives the map information and the traffic information from the first communication unit. The second storage unit stores the map information.

According to the invention, the map information recorded on a recording medium demountably mounted in the fixed unit is read by the recording medium reading unit, and transmitted to the portable unit together with the traffic information included in the digital broadcasting received by the fixed unit. The transmitted map information and traffic information are received by the portable unit. The map information is stored in the second storage unit. The navigation unit of the portable unit makes the second output unit display a map and the current location on the basis of the position information calculated by the position calculating unit provided in the portable unit and the map information stored in the second storage unit. In addition, the navigation unit finds a route from a starting point to a destination on the basis of the map information, the traffic information, and the starting point and destination inputted from the input unit. The found route is displayed on the second output unit together with the map. In such a manner, the portable unit can operate the navigation unit regardless of the attachment/detachment of the portable unit to/from the fixed unit.

In addition, since the map information is stored in the second storage unit of the portable unit, no recording medium reading unit for reading information recorded on a recorded medium demountably mounted in the portable unit has to be provided in the portable unit. Thus, the portable unit can be made simple in configuration, small in size and light in weight. Further, since the map information is stored in the second storage unit of the portable unit, the portable unit can operate the navigation unit even if the recording medium on which the map information is recorded is demounted from the recording medium reading unit of the fixed unit. Thus, another recording medium on which other information is recorded can be mounted on the recording medium reading unit of the fixed unit so that the information can be read.

According to a fifth aspect of the invention, there is provided a portable apparatus for a digital broadcasting receiving apparatus, the portable apparatus including a CPU for controlling the portable apparatus, a communication unit for transmitting/receiving information to/from an external apparatus, a storage unit for storing the received information, a decoding unit for decoding the received information, a battery power supply for supplying power to the portable apparatus, a position calculating unit for receiving position reference information from position information satellites and calculating position information regarding a current position of the portable unit based on the position reference information, and a display unit for displaying the decoded information and the current position thereon.

According to a sixth aspect of the invention, a program reservation method includes the steps of displaying service information, inputting program reservation information designating a program and an outputting period, storing the program reservation information in a first side, transmitting the program reservation information via radio waves, receiving the program reservation information via radio waves, storing the program reservation information in a second side, and outputting the program during the period.

BRIEF DESCRIPTION OF THE DRAWING

FIG. 1 is a block diagram showing the configuration of a digital broadcasting receiving apparatus according to an embodiment of the invention.

DETAILED DESCRIPTION OF THE PREFERRED EMBODIMENTS

FIG. 1 is a block diagram showing the configuration of a digital broadcasting receiving apparatus 1 according to an embodiment of the invention. The digital broadcasting receiving apparatus 1 is mounted on a movable body such as a car, receives terrestrial digital audio broadcasting (hereinafter, referred to as "digital audio broadcasting" simply) including audio information and multimedia information containing character data, graphic data, etc., and reproduces and displays the audio information and the multimedia information received thus.

In the digital audio broadcasting, the audio information is encoded in conformity with MPEG2 Audio AAC. The audio information and the multimedia information are multiplexed by packet unit in conformity with MPEG-2 Systems for every channel defined in accordance with the frequency of a carrier wave in a VHF band. The multiplexed signal is digital-modulated and transmitted in conformity with orthogonal frequency division multiplexing (abbreviated to "OFDM"). In the digital audio broadcasting, the encoded information is broadcast by program unit on each of a plurality channels.

The digital broadcasting receiving apparatus 1 has a fixed unit 2 fixedly mounted on the movable body such as the car, and a portable unit 3 removably attached to the fixed unit 2.

The fixed unit 2 is constituted by a tuner portion 10, a demodulator/demultiplexer portion 11, an audio decoder portion 12, an audio amplification/control portion 13, a first central processor portion (hereinafter abbreviated to "first CPU") 14, a first radio interface (hereinafter abbreviated to "first radio IF") 15, a first memory 16, a CD drive 17 and an operation/display portion 18.

The first CPU 14 controls the fixed unit 2 generally. The tuner portion 10 as a receiving unit receives digital audio broadcasting through an antenna 19 mounted on the car. The tuner portion 10 extracts packets included in a selected channel from the received digital audio broadcasting in accordance with a channel selection instruction from the operation/display portion 18, and feeds the extracted packets to the demodulator/demultiplexer portion 11. The demodulator/demultiplexer portion 11 demodulates the packets from the tuner portion 10 in accordance with an instruction from the first CPU 14. In addition, the demodulator/demultiplexer portion 11 extracts packets including encoded audio information and feeds the extracted packets to the audio decoder portion 12, while feeding the first CPU 14 the remaining information, that is, packets including multimedia information.

The audio decoder portion 12 as a first decoding unit decodes the packets including the encoded audio information in accordance with an instruction from the first CPU 14, and feeds a signal including the decoded audio information to the audio amplification/control portion 13. In accordance with a volume instruction from the operation/display portion 18, the audio amplification/control portion 13 as a first output unit amplifies the signal including the decoded audio information, and feeds the amplified signal to a speaker 40 mounted on the car so as to make an audio output.

The first radio IF 15 makes radio communication with a second radio interface (hereinafter abbreviated to "second radio IF") 30 of the portable unit 3, which will be described later, so as to exchange information. The CD drive 17 as a recording medium reading unit reads information recorded on a compact disk (abbreviated to "CD") which is a recording medium demountably mounted in the fixed unit 2. The CD drive 17 feeds the read information to the first CPU 14. CDs are classified into audio CDs on which audio data are recorded and CD-ROMs on which data information such as graphic and map information are recorded. When an audio CD is mounted on the CD drive 17, encoded audio data recorded on the audio CD is decoded by the first CPU 14 and the audio decoder portion 12, amplified by the audio amplification/control portion 13, and outputted from the speaker 40.

The first memory 16 as a first storage unit is implemented by a random access memory (abbreviated to "RAM"). The first memory 16 stores information included in received digital audio broadcasting, information read by the CD drive 17, and information from the portable unit 3 which will be described later.

The operation/display portion 18 is, for example, implemented by buttons as an input unit and a liquid crystal display unit (abbreviated to "LCD"). When input operation is made by an operator, a channel selection instruction which is an instruction to receive a channel desired by the operator, a volume instruction which is an instruction to output audio information at a volume desired by the operator, and so on, are given to the first CPU 14. In addition, the operation/display portion 18 displays the channel number of digital audio broadcasting being received, the volume, and so on. The fixed unit 2 is operated with an electric current supplied from a vehicle power supply of the car mounted with the digital broadcasting receiving apparatus 1.

The portable unit 3 is constituted by a second radio IF 30, a global positioning system (hereinafter abbreviated to "GPS") 31, a second central processor portion (hereinafter abbreviated to "second CPU") 32, a second memory 33, a graphic display control portion (hereinafter abbreviated to "GDC") 34, a display/operation portion 35 and a battery power supply 36.

The second CPU 32 as a second decoding unit and a navigation unit controls the portable unit 3 generally, decodes encoded multimedia information from the fixed unit 2, and performs navigation based on map information, traffic information and position information which will be described later.

The second radio IF 30 as a second communication unit makes radio communication with the first radio IF 15 of the fixed unit 2 so as to exchange information. The GPS 31 as a position calculating unit receives position reference information which is transmitted from a plurality of GPS satellites, which are position information satellites. The position reference information includes a unique identifier and an orbit of each GPS satellite, and time. The GPS 31 calculates position information regarding the current location of the portable unit 3 on the basis of the position reference information and feeds the calculated position information to the second CPU 32.

The second memory 33 as a second storage unit is implemented by an RAM. From the fixed unit 2, the second memory 33 stores information including multimedia information included in received digital audio broadcasting and information read by the CD drive 17. The GDC 34 makes graphic display control for the display/operation portion 35 in order to relieve the load on the second CPU 32. The graphic display control 35 will be described later.

The display/operation portion 35 is, for example, implemented by an LCD and a touch panel. The display/operation portion 35 displays the multimedia information, the information read by the CD drive 17 of the fixed unit 2, the information stored in the first and second memories 16 and 33, and the position information from the GPS 31. In addition, the display/operation portion 35 is operated by the operator so as to give various instructions from the operator to the second CPU 32. The battery power supply 36 supplies a current to the portable unit 3. The battery power supply 36 is charged when the portable unit 3 is attached to the fixed unit 2 or connected to a dedicated charger.

The first and second radio IFs 15 and 30 make radio communication with each other regardless of the attachment/detachment state of the portable unit 3 to/from the fixed unit 2. It is desired that the first and second radio IFs 15 and 30 have a communication frequency of 2.4 GHz, a data transfer rate of about 512 kbps or higher, and a transmission distance of about 5 m. When the communication between the fixed unit 2 and the portable unit 3 is secured by electric connection through a connector, the connector may deteriorate due to the attachment/detachment of the portable unit 3 or due to vibration occurring with the running of the car mounted with the digital broadcasting receiving apparatus 1. Thus, it can be considered that the communication between the fixed unit 2 and the portable unit 3 cannot be made normally. However, when the communication between the fixed unit 2 and the portable unit 3 is secured by radio communication, such a problem can be solved.

The operation to receive digital audio broadcasting will be described below in the digital broadcasting receiving apparatus 1 according to this embodiment. Assume that the portable unit 3 has been attached to the fixed unit 2. When the operator operates the operation/display portion 18 so as to input a channel desired by the operator, the operation/display portion 18 gives a channel selection instruction to the tuner portion 10 through the first CPU 14. From digital audio broadcasting received through the antenna 19, only packets included in the channel desired by the operator are extracted and fed to the demodulator/demultiplexer portion 11 by the tuner portion 10.

After that, the digital audio broadcasting is separated into packets including audio information and packets including multimedia information by the demodulator/demultiplexer portion 11. The encoded audio information is fed to the audio decoder portion 12 so as to be decoded. The decoded audio information is further fed to the audio amplification/control portion 13 so as to be amplified. The amplified audio information is outputted from the speaker 40 mounted on the car.

The multimedia information included in the digital audio signal separated by the demodulator/demultiplexer portion 11 is stored into the first memory 16 through the first CPU 14, and also transmitted to the second radio IF 30 of the portable unit 3 through the first radio IF 15. The multimedia information transmitted to the portable unit 3 is decoded by the second CPU 32 and stored into the second memory 33. The decoded multimedia information is also displayed on the display/operation portion 35 through the GDC 34. When the operator operates the operation/display portion 18 so as to input an instruction desired by the operator, the multimedia information is processed by the second CPU 32 in accordance with the input instruction, and displayed on the display/operation portion 35 through the GDC 34.

The multimedia information includes service information (abbreviated to "SI") which is character data including channels, airtime, broadcasting hours, and contents of programs to be broadcast by the digital audio broadcasting. The SI together with the other multimedia information are stored in the first memory 16 of the fixed unit 2 and transmitted to the portable unit 3. The SI transmitted to the portable unit 3 is stored in the second memory 33 and processed by the second CPU 32. Thus, electronic program guide (abbreviated to "EPG") is created by the second CPU 32 and displayed on the display/operation portion 35. The EPG is displayed as a table in which respective programs are aligned for every channel in the column direction and for every hour in the row direction, for example, like a TV page of newspaper. The SI included in the digital audio broadcasting is received periodically, and compared with the SI stored in the first and second memories 16 and 33. Thus, the SI is updated with the latest information suitably, and stored.

Assume that the operator browses the EPG displayed on the display/operation portion 35 and operates the display/operation portion 35 so as to make an input to display the contents desired by the operator. In this case, on the basis of an input instruction from the display/operation portion 35, the second CPU 32 processes the EPG into another EPG arranged in accordance with the contents desired by the operator, for example, in accordance with categories desired by the operator, such as news and sports. Further, still pictures are added and displayed on the display/operation portion 35 in accordance with necessity.

Assume that the operator browses the EPG displayed on the display/operation portion 35 and operates the display/operation portion 35 so as to select a program being on air at the moment. In this case, a channel selection instruction is transmitted to the first radio IF 15 of the fixed unit 2 through the second CPU 32 and the second radio IF 30. The channel selection instruction is given to the tuner portion 10 so that the audio of the selected program is outputted from the speaker 40 while multimedia information included in the selected program is displayed on the display/operation portion 35.

Assume that the operator browses the EPG displayed on the display/operation portion 35 and operates the display/operation portion 35 so as to input a reservation of reception for a desired program. In this case, the second CPU 32 creates program reservation information including a channel to broadcast the program desired to reserve, an airdate, air time and air finish time, on the basis of the SI. The program reservation information is stored in the second memory 33. The program reservation information is transmitted to the first radio IF 15 of the fixed unit 2 through the second radio IF 30, and stored in the first memory 16 of the fixed unit 2.

On the basis of the program reservation information stored in the first memory 16, the first CPU 14 of the fixed unit 2 gives a channel selection instruction to the tuner portion 10 when it is the start time of the reserved program. Thus, from the digital audio broadcasting received through the antenna 19, a signal included in the channel specified by the program reservation information is extracted and fed to the demodulator/demultiplexer portion 11. After that, audio information and multimedia information included in the received digital audio broadcasting are outputted from the speaker 40 and displayed on the display/operation portion 35 as described previously.

In the digital broadcasting receiving apparatus 1 in the case where the portable unit 3 has been attached to the fixed unit 2, in such a manner, digital audio broadcasting is received, and audio information is outputted while multimedia information is displayed. The multimedia information included in the digital audio broadcasting is displayed on the display/operation portion 35 of the portable unit 3. Therefore, the operator can browse the multimedia information displayed on the display/operation portion 35 of the portable unit 3 which is detached from the fixed unit 2, brought and carried out of the car. Further, the operator can make reservations of programs. The multimedia information is transmitted to the portable unit 3 through the fixed unit 2 appropriately, and stored in the second memory 33 of the portable unit 3.

According to the digital broadcasting receiving apparatus 1 in this embodiment, the fixed unit 2 has the tuner portion 10, the first memory 16, the audio decoder portion 12, the audio amplification/control portion 13, and the first radio IF 15. The tuner portion 10 receives digital audio broadcasting including encoded audio information and encoded multimedia information. The first memory 16 stores information included in the received digital audio broadcasting. The audio decoder portion 12 decodes the audio information included in the received digital audio broadcasting. The audio amplification/control portion 13 outputs the decoded audio information. The first radio IF 15 transmits the multimedia information included in the received digital audio broadcasting to the portable unit 3. Thus, the fixed unit 2 can suitably store, decode and output the audio information included in the received digital audio broadcasting, while the fixed unit 2 can also transmit the multimedia information to the portable unit 3.

The portable unit 3 removably attached to the fixed unit 2 has the second radio IF 30, the second memory 33, the second CPU 32 and the display/operation portion 35. The second radio IF 30 receives information including multimedia information transmitted from the fixed unit 2. The second memory 33 stores the information from the fixed unit 2. The second CPU 32 decodes the multimedia information. The display/operation portion 35 outputs the decoded multimedia information. Thus, regardless of the attachment/detachment of the portable unit 3 to/from the fixed 2, the portable unit 3 can receive multimedia information from the fixed unit 2 and display the received multimedia information on the display/operation portion 35 while the portable unit 3 can store the information. In the state in which the portable unit 3 configured thus has been attached to the fixed unit 2, the digital broadcasting receiving apparatus 1 can store and output all the information included in the received digital audio broadcasting.

Of the information included in the received digital audio broadcasting, the audio information is decoded and outputted in the fixed unit 2, while the multimedia information is processed and displayed on the portable unit 3. Accordingly, processing required for decoding and outputting information in each of the fixed unit 2 and the portable unit 3 is reduced in comparison with the case where all the information included in the received digital audio broadcasting is decoded and outputted in either the fixed unit 2 or the portable unit 3. Thus, decoding and outputting can be performed rapidly while the operationality is improved. Since the capacity required for the multimedia information is much smaller than that for the audio information, the second memory 33 of the portable unit 3 can be composed of an RAM having a small capacity.

According to the digital broadcasting receiving apparatus 1 in this embodiment, the portable unit 3 includes the display/operation portion 35 which displays multimedia information and which is operated by an operator. The fixed unit 2 stores service information included in received digital audio broadcasting into the first memory 16 and transmits the service information to the portable unit 3. The portable unit 3 receives the service information from the fixed unit 2, stores the received service information into the second memory 33, displays the service information on the display/operation portion 35, creates program reservation information including channels and airtime based on input from the display/operation portion 35 and the service information, stores the program reservation information into the second memory 33, and transmits the program reservation information to the fixed unit 2 through the second radio IF 30 so as to make the first memory 16 of the fixed unit 2 store the program reservation information. Thus, regardless of the attachment/detachment state of the portable unit 3 to/from the fixed unit 2, the operator can make reservations of desired programs easily by inputting channels and airtime of the desired programs through the display/operation portion 35 while browsing the service information displayed on the display/operation portion 35. In addition, the fixed unit 2 can receive the programs desired by the operator on the basis of the program reservation information.

In addition, since the program reservation information is stored in the second memory 33 of the portable unit 3, the operator can browse the program reservation information regardless of the attachment/detachment state of the portable unit 3 to/from the fixed unit 2. Further, the program reservation information is stored in the first and second memories 16 and 33 of the fixed unit 2 and the portable unit 3, respectively. Accordingly, if the program reservation information stored in the first memory 16 of the fixed unit 2 were deleted for some reason, the fixed unit 2 could receive the programs desired by the operator on the basis of the program reservation information stored in the second memory 33 of the portable unit 3. On the contrary, if the program reservation information stored in the second memory 33 of the portable unit 3 were deleted for some reason, the portable unit 3 could make the display/operation portion 35 display the program reservation information stored in the first memory 16 of the fixed unit 2.

The operation about navigation in the digital broadcasting receiving apparatus 1 in this embodiment will be described below. Traffic information showing conditions of traffic routes in the periphery of the car mounted with the digital broadcasting receiving apparatus 1 is included in the multimedia information of the digital audio broadcasting. In addition, when a CD-ROM on which map information is recorded is mounted on the CD drive 17 of the fixed unit 2, the CD drive 17 reads the CD-ROM and stores the map information into the first memory 16. The map information is also transmitted to the portable unit 3 through the first radio IF 15. The map information transmitted from the fixed unit 2 is received by the second radio IF 30 of the portable unit 3 and stored in the second memory 33.

The GPS 31 receives position reference information transmitted from a plurality of GPS satellites. The position reference information includes a unique identifier and an orbit of each GPS satellite, and time. The GPS 31 calculates position information regarding the current location of the portable unit 3 on the basis of the position reference information.

The second CPU 32 executes a current location display function to display the current location of the portable unit 3 superimposed on the map on the display/operation portion 35 on the basis of the map information and the position information, and a route finding function to find a route from a starting point to a destination and display the found route superimposed on the map on the display/operation portion 35 on the basis of the map information, the traffic information, the starting point and the destination input through the display/operation portion 35 by the operator. Thus, navigation is carried out. On this occasion, the first CPU 14 of the fixed unit 2 may make voice synthesis on the basis of the map information, the traffic information and the position information so as to perform navigation by voice through the audio amplification/control portion 13 and the speaker 40.

Further, since the GPS 31 is provided in the portable unit 3 and the map information recorded on the CD-ROM is stored in the second memory 33 of the portable unit 3, the portable unit 3 can perform navigation outside the car even if the portable unit 3 is detached from the fixed unit 2.

According to the digital broadcasting receiving apparatus 1 in this embodiment, the fixed unit 2 includes a CD drive 17 for reading information recorded on a CD-ROM demountably mounted in the fixed unit 2. The portable unit 3 includes a GPS 31 for receiving position reference information from GPS satellites and calculating position information about the current location of the portable unit 3 based on the position reference information, and a second CPU 32 for executing a current location display function to display a map and the current location on the display/operation portion 35 based on map information and the position information, and a route finding function to find a route from a starting point to a destination and display a map and the found route on the display/operation portion 35 on the basis of the map information, the traffic information, the input starting point and the input destination. The fixed unit 2 transmits the portable unit 3 the map information recorded on the CD-ROM and read therefrom by the CD drive 17 and the traffic information included in the received digital audio broadcasting. The portable unit 3 receives the map information and the traffic information from the fixed unit 2, stores the map information into the second memory 33, and performs navigation based on the stored map information, the calculated position information, the starting point and the destination input through the display/operation portion 35, and the traffic information. Thus, the portable unit 3 can perform navigation regardless of the attachment/detachment state of the portable unit 3 to/from the fixed unit 2.

In addition, since the map information is stored in the second memory 33 of the portable unit 3, no recording medium reading unit, for example, no CD drive, for reading information recorded on a recorded medium such as a CD-ROM demountably mounted in the portable unit 3 has to be provided in the portable unit 3. Thus, the portable unit 3 can be made simple in configuration, small in size and light in weight. Further, since the map information is stored in the second memory 33 of the portable unit 3, the portable unit 3 can perform navigation even if the CD-ROM on which the map information is recorded is demounted from the CD drive 17 of the fixed unit 2. Thus, another CD-ROM or audio CD on which other information is recorded can be mounted on the CD drive 17 of the fixed unit 2 so that the information can be read.

In such a manner, in the digital broadcasting receiving apparatus 1 in this embodiment, the portable unit 3 has the second CPU 32, the second memory 33, the GPS 31 and the display/operation portion 35 as described above. Thus, even if the portable unit 3 is detached from the fixed unit 2, the portable unit 3 cannot only display multimedia information included in digital audio broadcasting, but can also create and display EPG on the basis of SI included in the multimedia information and make reservations of programs in accordance with input of the operator. Further, the portable unit 3 can perform navigation on the basis of the traffic information included in the multimedia information, the position information by the GPS 31, and the map information stored in the second memory 33.

Although terrestrial digital audio broadcasting is received in the digital broadcasting receiving apparatus 1 in this embodiment, terrestrial digital broadcasting including graphic information including moving pictures and still pictures, audio information and multimedia information may be received. In this case, the audio information and the multimedia information included in the terrestrial digital broadcasting are outputted and displayed.

In addition, although the communication between the fixed unit 2 and the portable unit 3 is made by radio in the digital broadcasting receiving apparatus 1 in this embodiment, the communication between the fixed unit 2 and the portable unit 3 may be made via a connector connecting the both.

In addition, although the multimedia information is stored in the first memory 16 of the fixed unit 2 in the digital broadcasting receiving apparatus 1 in this embodiment, all the audio information included in the received digital audio broadcasting does not have to be stored. Only a part thereof desired by the operator may be stored.

In addition, although the recording medium reading unit mounted on the fixed unit 2 is a CD drive 17 for reading a CD-ROM and an audio CD in the digital broadcasting receiving apparatus 1 in this embodiment, it may be a digital versatile disk (abbreviated to "DVD") drive for reading a DVD, a multi-drive capable of reading a CD and a DVD, a magneto-optical disk (abbreviated to "MO") drive for reading an MO, or a unit removably mounted in the fixed unit 2 for reading a memory card having a read only memory (abbreviated to "ROM").

As described above, according to the invention, the portable unit can receive the remaining kinds of information from the fixed unit, and output and store the received information regardless of the attachment/detachment state of the portable unit to/from the fixed unit. In the state in which such a portable unit is attached to the fixed unit, the digital broadcasting receiving apparatus can store and output all the information included in the received digital broadcasting.

Of the information included in the received digital broadcasting, a specific kind of information is decoded and outputted in the fixed unit, while the remaining kinds of information are decoded and outputted in the portable unit. Accordingly, processing required for decoding and outputting information in each of the fixed unit and the portable unit is reduced in comparison with the case where all the information included in the received digital broadcasting is decoded and outputted in either the fixed unit or the portable unit. Thus, decoding and outputting can be performed rapidly while the operationality is improved.

In addition, according to the invention, regardless of attachment/detachment state of the portable unit to/from the fixed unit, an operator can make reservations of desired programs easily by inputting channels and airtimes of the desired programs from the input unit while browsing the service information displayed on the second output unit. In addition, the fixed unit can receive the programs desired by the operator on the basis of the program reservation information.

In addition, since the program reservation information is stored in the second storage unit of the portable unit, the operator can browse the program reservation information regardless of the attachment/detachment state of the portable unit to/from the fixed unit. Further, the program reservation information is stored in the respective storage units of the fixed unit and the portable unit. Accordingly, if the program reservation information stored in the first storage unit of the fixed unit were deleted for some reason, the fixed unit could receive the programs desired by the operator on the basis of the program reservation information stored in the second storage unit of the portable unit. On the contrary, if the program reservation information stored in the second storage unit of the portable unit were deleted for some reason, the portable unit could make the second output unit display the program reservation information stored in the first storage unit of the fixed unit.

In addition, according to the invention, the portable unit can operate the navigation unit regardless of the attachment/detachment state of the portable unit to/from the fixed unit.

In addition, since the map information is stored in the second storage unit of the portable unit, no recording medium reading unit for reading information recorded on a recorded medium demountably mounted in the portable unit has to be provided in the portable unit. Thus, the portable unit can be made simple in configuration, small in size and light in weight. Further, since the map information is stored in the second storage unit of the portable unit, the portable unit can operate the navigation unit even if the recording medium on which the map information is recorded is demounted from the recording medium reading unit of the fixed unit. Thus, another recording medium on which other information is recorded can be mounted on the recording medium reading unit of the fixed unit so that the information can be read.

What is claimed is:

[1. A digital broadcasting receiving apparatus, comprising:

a fixed unit; and a portable unit removably attached to the fixed unit, wherein the fixed unit has:

a receiving unit for receiving digital broadcasting including a plurality of kinds of encoded information;

a first decoding unit for decoding a specific kind of information included in the received digital broadcasting;

a first storage unit for storing the remaining kinds of information included in the received digital broadcasting;

a first output unit for outputting the information decoded by the first decoding unit; and a first communication unit for transmitting the remaining kinds of information included in the received digital broadcasting to the portable unit; and the portable unit has:

a second communication unit for receiving the information transmitted from the first communication unit;

a second storage unit for storing the information transmitted from the first communication unit;

a second decoding unit for decoding the remaining kinds of information transmitted from the first communication unit; and a second output unit for outputting the information decoded by the second decoding unit.]

[2. The digital broadcasting receiving apparatus according to claim 1, wherein the portable unit further includes a battery power supply for supplying power to the portable unit.]

[3. The digital broadcasting receiving apparatus according to claim 1, wherein processing required for decoding and outputting information in each of the fixed unit and the portable unit is reduced.]

[4. A digital broadcasting receiving apparatus, comprising:

a fixed unit; and a portable unit removably attached to the fixed unit, wherein the fixed unit has:

a receiving unit for receiving digital broadcasting including a plurality of kinds of encoded information;

a first decoding unit for decoding a specific kind of information included in the received digital broadcasting;

a first storage unit for storing the remaining kinds of information included in the received digital broadcasting;

a first output unit for outputting the information decoded by the first decoding unit; and a first communication unit for transmitting the remaining kinds of information included in the received digital broadcasting to the portable unit; and the portable unit has:

a second communication unit for receiving the information transmitted from the first communication unit;

a second storage unit for storing the information transmitted from the first communication unit;

a second decoding unit for decoding the information transmitted from the first communication unit;

a second output unit for outputting the information decoded by the second decoding unit;

wherein the digital broadcasting is broadcast encoded information by program unit on each of a plurality of channels;

wherein the digital broadcasting has service information including a channel, airtime and program contents of each program to be broadcast;

wherein the portable unit further includes an input unit operated by an operator;

wherein the second output unit has a display function;

wherein the first storage unit stores the received service information and program reservation unit;

wherein the first communication unit transmits the service information to the portable unit; and wherein the second communication unit receives the service information from the first communication unit and transmits the program reservation information to the first communication unit;

wherein the second storage unit stores the received service information and the program reservation information;

wherein the second output unit displays the service information; and wherein the portable unit creates the program reservation information including channels and airtimes based on an input from the input unit and the service information.]

[5. A digital broadcasting receiving apparatus, comprising:

a fixed unit; and a portable unit removably attached to the fixed unit, wherein the fixed unit has:

a receiving unit for receiving digital broadcasting including a plurality of kinds of encoded information;

a first decoding unit for decoding a specific kind of information included in the received digital broadcasting;

a first storage unit for storing the remaining kinds of information included in the received digital broadcasting;

a first output unit for outputting the information decoded by the first decoding unit; and a first communication unit for transmitting the remaining kinds of information included in the received digital broadcasting to the portable unit; and the portable unit has:

a second communication unit for receiving the information transmitted from the first communication unit;

a second storage unit for storing the information transmitted from the first communication unit;

a second decoding unit for decoding the information transmitted from the first communication unit;

a second output unit for outputting the information decoded by the second decoding unit;

wherein the digital broadcasting includes traffic information showing conditions of traffic routes;

wherein the fixed unit further includes a recording medium reading unit for reading information recorded on a recording medium demountably mounted in the fixed unit;

wherein the first communication unit transmits the traffic information and map information read from the recording medium by the recording medium reading unit;

wherein the portable unit further includes:

a position calculating unit for receiving position reference information from position information satellites and calculating position information regarding a current position of the portable unit based on the position reference information;

an input unit operated by an operator; and a navigation unit for executing a route finding function to find a route from a starting point to a destination inputted from the inputting unit based on the map information, the traffic information, the starting point and the destination;

wherein the second output unit displays map, the current position, and the found route based on the map information, the position information, and the finding result;

wherein the second communication unit receives the map information and the traffic information from the first communication unit; and wherein the second storage unit stores the map information.]

*6. A system comprising:*

*an apparatus mounted on a movable body and having an audio-capability; and*

*a portable navigation unit removably attached to the apparatus and having a navigation-capability,*

*wherein the apparatus has:*

*a first communicating unit for radio receiving an instruction from the portable navigation unit; and*

*a first control unit for controlling the apparatus in response to the instruction received in the first communicating unit; and*

*the portable navigation unit has:*

*an operating unit for inputting an instruction by an operator;*

*a displaying unit for displaying various information;*

*a second communicating unit for radio transmitting the instruction input via the operating unit; and*

*a second control unit for displaying information based on map information and position information, and*

*wherein the apparatus supplies the portable navigation unit with electrical power and the displaying unit in the portable navigation unit is used as a display of the apparatus when the portable navigation unit attaches to the apparatus, and*

*wherein the apparatus can be operated by the instruction inputted by the operating unit in the portable navigation unit when the portable navigation unit attaches to the apparatus.*

* * * * *